Dec. 5, 1950        W. R. CUSTER        2,532,482
BOUNDARY LAYER REMOVER FOR AIRPLANES
Filed Aug. 6, 1947
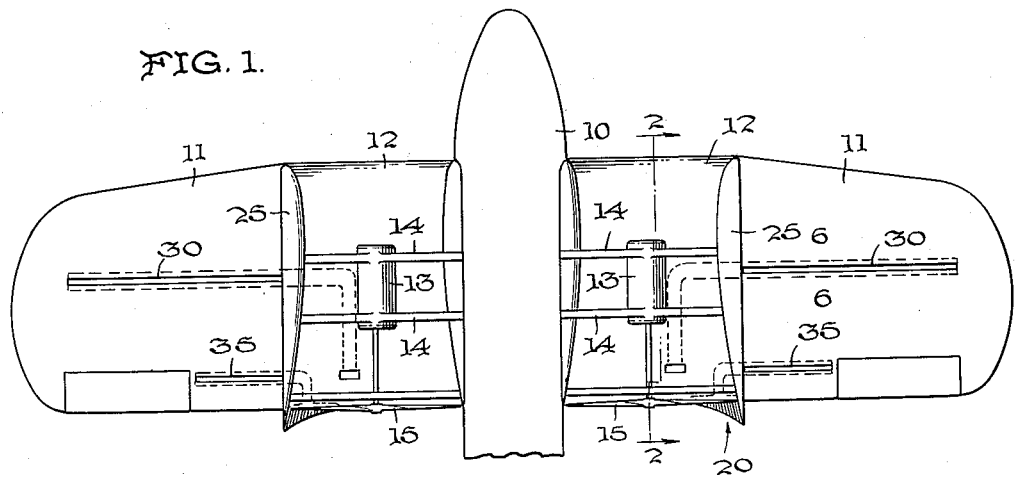
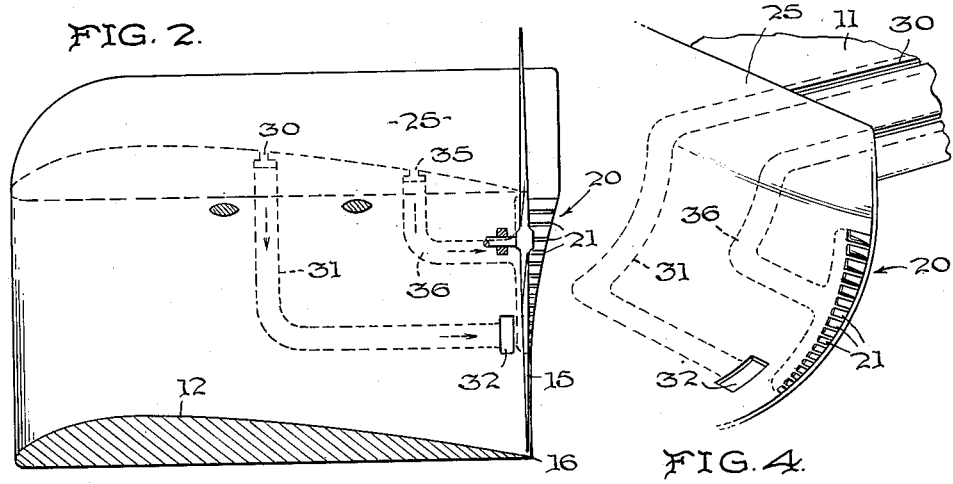
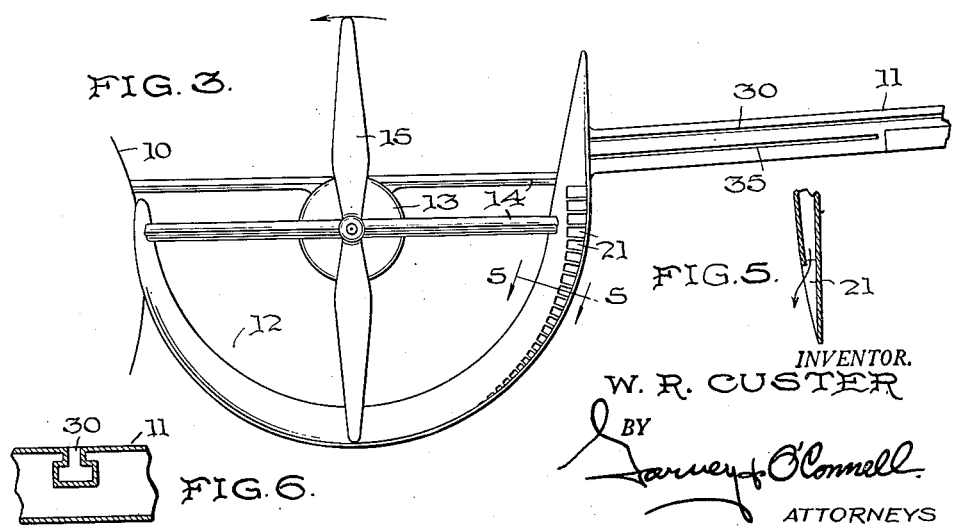
INVENTOR.
W. R. CUSTER
BY
Harvey O'Connell
ATTORNEYS Patented Dec. 5, 1950

2,532,482

UNITED STATES PATENT OFFICE 2,532,482

BOUNDARY LAYER REMOVER FOR AIRPLANES

Willard R. Custer, Hagerstown, Md.

Application August 6, 1947, Serial No. 766,587

3 Claims. (Cl. 244—12)

This invention relates to a boundary layer remover for airplanes of the type having one or more fore-and-aft channel wing portions and is an improvement of co-pending application Serial Number 456,549, filed August 28, 1942, by Louis H. Crook and myself as joint inventors, which matured into Patent No. 2,428,737.

As is well known in the art the removal of boundary layer air is often of extreme importance because turbulence over the wings that would otherwise result under certain conditions thus can be prevented. It is the principal object of this invention to provide a boundary layer remover wherein the boundary layer air is exhausted aft of the propeller.

Another object of the invention is to utilize both the blast aft of the propeller disc and the low pressure created in the channel immediately in front of the propeller disc, for the purpose of removing boundary layer air from the top of the wing-end portions.

Other objects of the invention will be apparent to those skilled in the art, from the following specification taken with the appended drawings, wherein Figure 1 is a fragmentary top plan view of an airplane having wings including channel portions, the wings being provided with a boundary layer remover;

Figure 2 is a transverse sectional view through one of the wing channels taken on the line 2—2 of Figure 1 looking in the direction of the arrows;

Figure 3 is a fragmentary rear elevation view of one of the wings and its propeller;

Figure 4 is a fragmentary perspective view of the aft part of a wing channel showing the boundary layer removal system;

Figure 5 is a detail fragmentary sectional view taken on the line 5—5 of Figure 3 looking in the direction of the arrows showing detail of one of the boundary layer removal ducts; and Figure 6 is a detail fragmentary sectional view taken on the line 6—6 of Figure 1 of a boundary layer removal slot of the top of one of the wings.

Referring now in greater detail to the drawings wherein I show one embodiment of the invention, a fuselage 10 is employed, which has wings extending from its opposite sides, each wing comprising an inboard channel portion 12 and an outboard end portion 11. Each channel extends in a fore-and-aft direction, opens upwardly, and is of substantially uniform depth and width throughout its length. The portion 11 of each wing is similar to the tip portion of a conventional airplane. A power plant 13 is supported by braces 14 disposed in each channel 12 and is operatively connected to a propeller 15. Each propeller is located in close proximity to the aft edge 16 of its channel. The propellers 15, when rotating, effectively seal the aft ends of the semicircular channels 12 from reverse inrush of air into the channels. This arrangement results in greatly increased lift, particularly static lift.

Extending aft from the channels 12 are boundary layer removal ducts generally designated 20, having radially disposed partitions 21, which are substantially triangular in shape and serve to constrain the air flowing past them to a rearward direction. Without the partitions 21, the air after leaving the propellers 15 would be free to travel past the ducts 20 in the path of a spiral. The ducts 20 issue from the outer sidewalls of each channel 12 aft of the propeller disc and gradually increase in length toward the top of the channel as advantageously illustrated in Figures 2 and 4. Fins 25 extend upwardly from the junction of the channel portions 12 and the end portions 11 of the wings, the height of the fins being preferably equal to approximately one-sixth of the diameter of the propeller disc. Ducts at the tops of the channels are co-extensive with the edges of the fins 25 aft of the propeller disc. The fins 25 aerodynamically isolate the channels 12 of the wings from the wing-end portions 11 and limit the spilling of air from over the wing-end portions 11 into the channels 12.

Boundary layer removal slots 30 and 35 are formed in the top surface of each wing-end portion 11 aft of the point of maximum thickness of the wing, for the removal of boundary layer air there present when the airplane is in flight. When the propellers 15 are rotating a low pressure is created in the channels 12 causing boundary layer air to be drawn through the slots 30 into the conduits 31, formed in the wing channel walls, and vented into the channels 12 through openings 32. The air driven past the mouth of the ducts 20 by the propellers 15 creates a low pressure in the ducts, which draws boundary layer air through the slots 35 into the conduits 36 and then out ducts 20. It is thereby possible to utilize both the blast at the rear of the propeller and the low pressure created in front of the propeller for the purpose of removing boundary layer air from the top of wing-end portions 11. A highly effective means is thus provided for the removal of boundary layer air with a minimum loss of energy.

While I have shown and described only one embodiment of my invention, it is to be understood that I am not to be limited thereto and that changes may be made in the invention without departing from the spirit and scope of the claims.

What is claimed as new is:

1. In an airplane wing: an upwardly-opening fore-and-aft-running channel portion, and a propeller mounted to rotate therein and disposed in such manner as to be effective to produce a rearward flow of air over the inside channel wall; a second wing portion adjacent the channel portion, being provided with a boundary layer removal slot; and a conduit leading from said slot to an opening in the channel portion immediately behind the plane of rotation of the propeller.

2. An airplane wing comprising a first portion and a second contiguous portion disposed consecutively in a spanwise direction, said first portion being shaped to form an upwardly-opening channel extending in the direction of flight from the leading edge to the trailing edge of the wing, the upper surface of said second portion being provided with a pair of slots, a conduit leading from one of said slots to an opening in the channel of said first portion, and a conduit leading from the other slot to the aft terminal of said channel and a propeller disposed with respect to said channel in such manner that the propeller disc is interposed between the outlets of said conduits for withdrawing the boundary layer air through the opening in the channel and through the conduit outlet at the aft terminal of the channel.

3. An airplane wing comprising a first portion and a second contiguous portion disposed consecutively in a spanwise direction, said first portion being shaped to form an upwardly opening channel extending in the direction of flight from the leading edge to the trailing edge of the wing, a propeller mounted to rotate in close proximity to the aft edge of the channel, said propeller being disposed with respect to said channel in such manner as to be effective to produce a rearward flow of air over the inside channel wall the upper surface of the second portion being provided with a slot, and a conduit leading from said slot to a point in said channel wall aft of the propeller disc.

WILLARD R. CUSTER.

REFERENCES CITED

The following references are of record in the file of this patent:

UNITED STATES PATENTS

| Number | Name | Date |
|---|---|---|
| 1,868,832 | Henter et al. | July 25, 1932 |
| 1,913,809 | Lanier | June 13, 1933 |
| 1,980,139 | Jones | Nov. 6, 1934 |
| 2,428,737 | Crook et al. | Oct. 7, 1947 |